C. BODMER.
SQUARE AND BEVEL BLADE FASTENING.
APPLICATION FILED JULY 18, 1919.
1,322,086.
Patented Nov. 18, 1919.
2 SHEETS—SHEET 1.
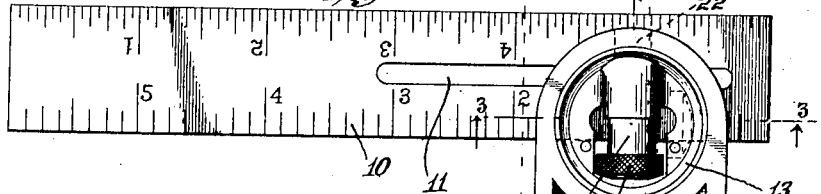
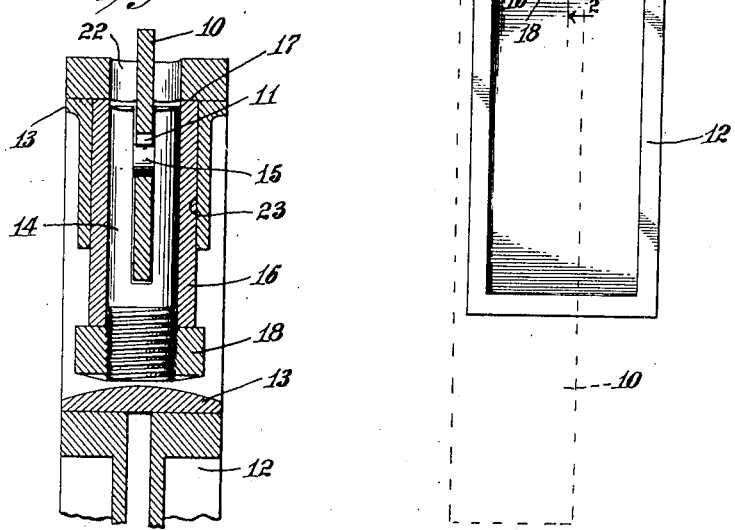
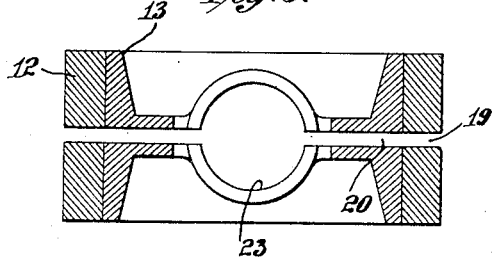
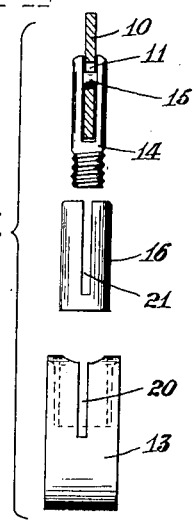
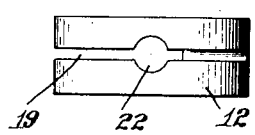
WITNESS
INVENTOR
Christian Bodmer
BY
Mitchell & Allen
ATTORNEYS C. BODMER.
SQUARE AND BEVEL BLADE FASTENING.
APPLICATION FILED JULY 18, 1919.
1,322,086.
Patented Nov. 18, 1919.
2 SHEETS—SHEET 2.
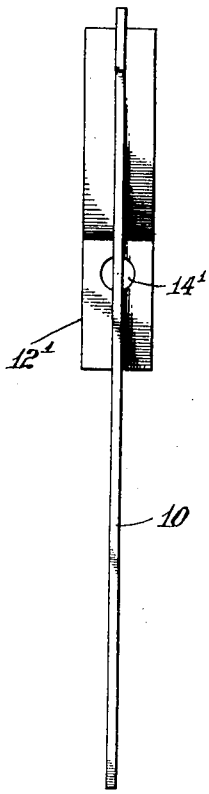
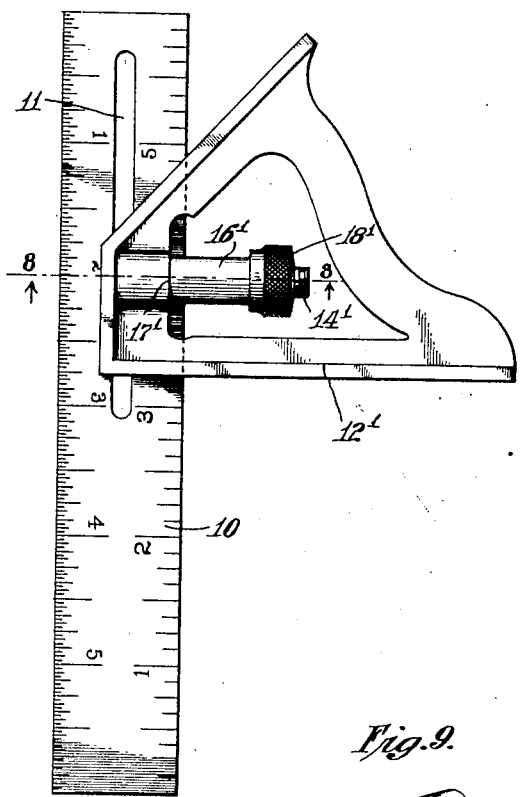
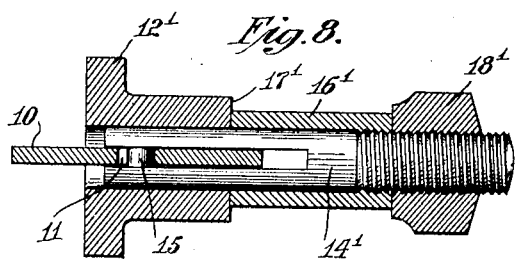
INVENTOR
Christian Bodmer
BY
ATTORNEYS

UNITED STATES PATENT OFFICE.

CHRISTIAN BODMER, OF NEW BRITAIN, CONNECTICUT, ASSIGNOR TO THE STANLEY RULE & LEVEL CO., OF NEW BRITAIN, CONNECTICUT, A CORPORATION OF CONNECTICUT.

SQUARE AND BEVEL BLADE FASTENING.

1,322,086.  Specification of Letters Patent. Patented Nov. 18, 1919.

Application filed July 18, 1919. Serial No. 311,829.

*To all whom it may concern:*

Be it known that I, CHRISTIAN BODMER, a citizen of the United States of America, residing at New Britain, Connecticut, have invented a new and useful Square and Bevel Blade Fastening, of which the following is a specification.

My invention relates to a form of device in which the blade is adjustable with relation to the handle or body part.

The main object is to provide a simple and inexpensive construction by which the parts can be readily clamped together in any one of a variety of adjusted relations and readily readjusted when desired.

The invention contemplates the use of a threaded connecting spindle, a clamp nut and a split sleeve on the spindle interposed between the clamp nut and the handle member and embracing one edge of the blade.

Two forms of devices embodying my invention are illustrated in the accompanying drawings:

Figure 1 is a side view of one form of the device embodying my invention.

Fig. 2 is an enlarged sectional view showing the construction of the connection between the handle member and the blade on the plane of the line 2—2 of Fig. 1.

Fig. 3 is a sectional view of the handle member on the plane of the line 3—3 of Fig. 1.

Fig. 4 is an end view of the handle member.

Fig. 5 shows details of the blade, spindle, split sleeve, and a part of the handle member.

Fig. 6 is a side view of another form of device embodying my invention.

Fig. 7 is an edge view of the same.

Fig. 8 is an enlarged sectional view on the plane of the line 8—8 of Fig. 6.

Fig. 9 is a detail perspective view of the split sleeve.

The blade 10 is of the usual construction provided with any desirable scale and with a longitudinally extending slot 11 near one end.

The handle or body member, in the form shown in Fig. 1, is formed of two parts, the main part 12 and a hub member 13 which is rotatably mounted in one end of the part 12.

One end of the spindle 14 is loosely connected with the blade by means of a pin or rivet 15 which extends through the slot 11. The other end of the spindle is screw-threaded. A split sleeve 16 embraces the central part of the spindle and its outer end is adapted to abut against the surface or stop shoulder 17 of the handle member. The clamp nut 18 is screwed on to the end of the spindle and adapted to force the sleeve 16 to its seat.

The handle member 12 is provided with a slot, part of which extends longitudinally and part of which extends transversely at the end adjacent the blade so as to permit the blade to be swung and adjusted into various angles and positions. The hub member 13 of the handle is also provided with a slot 20 for the blade. The sleeve 16 is provided with a slot 21 for the blade. The outer end of the handle member is provided with a passage 22 through which the spindle may be withdrawn or through which the spindle may be inserted when the blade and handle member are at right angles to each other. The hub or bearing member 13 of the handle is provided with a tubular passage 23 for the sleeve 16. When the nut 18 is adjusted the blade is drawn to a seat in the bottom of the slot 20, and at the same time, the outer end of the sleeve is forced against the shoulder 17 of the main part of the handle member so as to prevent the hub and blade from rotating and hold it in the desired position.

In the form shown on Sheet 2, the blade is the same as in the first form. The handle member 12', however, in this case, is formed in one piece with converging bearing faces. The spindle member 14', the sleeve member 16' and the clamp nut or thumb-piece 18' are similar to the corresponding parts in the other form of the device, and in a similar manner the outer end of the sleeve 16' is clamped against the seat 17' by the action of the adjusting nut 18'. By loosening the nut, the blade may be adjusted to various positions as required.

I claim:

1. In a device of the character described, the combination of a slotted blade, a handle member having a shoulder, a clamping device consisting of a spindle having one end loosely connected with the slotted blade, a clamp nut on the opposite end of the spindle and a sleeve interposed between said clamp nut and said shoulder of the handle member.

2. In a device of the character described, a blade, a handle member having a hub portion rotatable in one end thereof, a spindle loosely connected with the blade and a single clamping nut and means operated by said nut for simultaneously clamping the blade to the hub portion and the hub portion in the remainder of the handle portion.

3. In a device of the character described, the combination of a blade member, a handle member having a hub portion rotatable in one end thereof, a spindle connected with the blade and projecting through one edge of the hub portion, a sleeve slidable on said spindle and a clamp nut coacting with said spindle and said sleeve.

4. In a device of the character described, the combination of a blade, a handle member, a spindle having one end loosely connected with the blade and screw threaded at the opposite end, a split sleeve embracing said spindle and one edge of the blade and having one end abutting against a part of the handle member, and a clamp nut on the screw threaded end of the spindle coacting with one end of said sleeve.

5. In a device of the character described, the combination of a slotted blade, a handle member having a hub portion rotatable in one end thereof, said handle member and its hub portion being slotted to receive said blade, a spindle having one end connected in the slot of said blade and the other end extending into the hub portion of the handle member, a clamp nut on the latter end of said spindle and a spacing member interposed between said clamp nut and the handle member.

6. A device of the character described comprising a combination with a blade having a longitudinal slot and a handle member having a slot with a bottom stop shoulder to receive said blade, a spindle loosely connected with said blade and having a portion engaging in said slot, the opposite end of the spindle being threaded, an operating member adjustable on the screw-threaded portion of said spindle, and a clamping sleeve on said spindle interposed between said operating member and a portion of said handle member.

7. In a device of the character described, the combination with a slotted blade, a handle member provided with longitudinal and transverse slots adapted to receive said blade and a hub portion rotatable in the main body of the handle and also provided with a slot having a stop face at the bottom adapted to coact with an edge of said blade, a spindle loosely connected at one end with said slotted blade and having a threaded portion on the opposite end, an operating end adjustable on the threaded portion of said spindle and a sleeve on said spindle adapted to be engaged by said member and movable through said hub portion to engage a part of the main body portion of the handle member.

CHRISTIAN BODMER.